United States Patent
Ghalyan

(10) Patent No.: US 12,417,410 B2
(45) Date of Patent: Sep. 16, 2025

(54) SYSTEMS AND METHODS FOR GENERATING OPTIMAL DATA PREDICTIONS IN REAL-TIME FOR TIME SERIES DATA SIGNALS

(71) Applicant: THE BANK OF NEW YORK MELLON, New York, NY (US)

(72) Inventor: Ibrahim F. Ghalyan, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 1076 days.

(21) Appl. No.: 17/369,524

(22) Filed: Jul. 7, 2021

(65) Prior Publication Data

US 2023/0012177 A1    Jan. 12, 2023

(51) Int. Cl.
*G06N 20/20* (2019.01)
*G06F 18/20* (2023.01)
(Continued)

(52) U.S. Cl.
CPC ............ *G06N 20/20* (2019.01); *G06F 18/211* (2023.01); *G06F 18/217* (2023.01);
(Continued)

(58) Field of Classification Search
CPC ... G06N 20/20; G06F 18/211; G06F 18/2193; G06F 18/217; G06F 18/285; G06F 2123/02
See application file for complete search history.

(56) References Cited

U.S. PATENT DOCUMENTS 11,556,789 B2 *   1/2023   Gugulothu ............. G06N 3/047
2002/0183931 A1   12/2002   Anno
(Continued)

FOREIGN PATENT DOCUMENTS

WO    WO-2021126500 A1 *   6/2021   ............. G06N 3/044
WO    WO-2022257187 A1 *  12/2022   ............ A61B 5/0205

OTHER PUBLICATIONS

Ghalyan et al., "Gaussian Smoothing Filter for Improved EMG Signal Modeling" Mar. 17, 2020, Chapter 6 Signal Processing in Medicine and Biology, pp. 161-204. (Year: 2020).*
(Continued)

*Primary Examiner* — Miranda M Huang
*Assistant Examiner* — Chase P. Hinckley
(74) *Attorney, Agent, or Firm* — Pillsbury Winthrop Shaw Pittman, LLP

(57) ABSTRACT

Methods and systems are disclosed for generating optimal data predictions in time series data signals based on empirically-optimized model selection, noise filtering, and window size selection using machine learning models. For example, the system may receive a first subset of time series data. The system may receive a prediction horizon. The system may generate a feature input based on the first subset of time series data and the prediction horizon. The system may input the feature input into a machine learning model, wherein the machine learning model includes multiple components. The system may receive an output from the machine learning model. The system may generate for display, on a user interface, a prediction for the first subset of time series data at the prediction horizon based on the output.

20 Claims, 8 Drawing Sheets

(51) Int. Cl.
  *G06F 18/21*   (2023.01)
  *G06F 18/211*  (2023.01)
  *G06F 123/02*  (2023.01)

(52) U.S. Cl.
  CPC ........ *G06F 18/2193* (2023.01); *G06F 18/285* (2023.01); *G06F 2123/02* (2023.01)

(56) References Cited

U.S. PATENT DOCUMENTS

| | | | |
|---|---|---|---|
| 2019/0265971 A1 | 8/2019 | Behzadi et al. | |
| 2020/0097810 A1 | 3/2020 | Hetherington et al. | |
| 2020/0242483 A1* | 7/2020 | Shashikant Rao | G06F 16/285 |
| 2021/0081492 A1* | 3/2021 | Higginson | G06N 5/02 |
| 2022/0172038 A1* | 6/2022 | Chen | G06N 3/045 |
| 2022/0180207 A1* | 6/2022 | Liang | G06N 3/045 |
| 2023/0018125 A1* | 1/2023 | Lim | G06N 3/045 |
| 2024/0023884 A1* | 1/2024 | Liu | G06V 10/82 |

OTHER PUBLICATIONS

Wang et al., "ConceptExplorer: Visual Analysis of Concept Drifts in Multi-source Time-series Data" Jan. 4, 2021, pp. 1-11. (Year: 2021).*

Fawaz et al., "Deep Neural Network Ensembles for Time Series Classification" Apr. 26, 2019, arXiv: 1903.066602v2, pp. 1-6. (Year: 2019).*

Javeri et al., "Improving Neural Networks for Time-Series Forecasting using Data Augmentation and AutoML" May 7, 2021, arXiv: 2103.01992v3, pp. 1-8. (Year: 2021).*

Middlehurst et al., "HIVE-COTE 2.0: a new meta ensemble for time series classification" Apr. 15, 2021, arXiv: 2104.07551v1, pp. 1-35. (Year: 2021).*

Shi et al., "For2For: Learning to forecast from forecasts" Jan. 14, 2020, arXiv: 2001.04601v1, pp. 1-13. (Year: 2020).*

Elsayed et al., "Do We Really Need Deep Learning Models for Time Series Forecasting?" Jan. 6, 2021, arXiv: 2101.02118v1, pp. 1-14. (Year: 2021).*

International Search Report & Written Opinion of the International Searching Authority dated Nov. 3, 2022, issued in corresponding International Application No. PCT/US2022/035252 (15 pgs.).

International Preliminary Report on Patentability dated Jan. 18, 2024, issued in corresponding International Patent Application No. PCT/US2022/035252 (8 pgs.).

Ibrahim Fahad Jasim Ghalyan, "Force-Controlled Robotic Assembly Processes of Rigid and Flexible Objects: Methodologies and Applications", Springer, Cham. Switzerland, 2016, 17 pgs.

Elhanan Elboher et al., "Efficient and Accurate Gaussian Image Filtering Using Running Sums ," Computing Research Repository, vol. abs/1107.4958, 2011. http://arxiv.org/abs/1107.4958.

I.F. Ghalyan et al., "Gaussian Filtering of EMG Signals for Improved Hand Gesture Classification", Proc. 2018 IEEE Signal Processing in Medicine and Biology Symposium (SPMB), Philadelphia, PA, 2018, pp. 1-6, doi: 10.1109/SPMB.2018.8615596.

Ibrahim F.J. Ghalyan et al., "Gaussian Smoothing Filter for Improved EMG Signal Modeling ," Proc. 2018 IEEE Signal Processing in Medicine and Biology Symposium (SPMB), Philadelphia, PA, 2018, pp. 1-6, doi: 10.1109/SPMB.2018.8615596.

Pascal Gwosdek et al., "Theoretical Foundations of Gaussian Convolution by Extended Box Filtering", International Conference on Scale Space and Variational Methods in Computer Vision, pp. 447-458, 2011. http://dx.doi.org/10.1007/978-3-642-24785-9_38.

Richard A. Haddad et al., "A Class of Fast Gaussian Binomial Filters for Speech and Image Processing", IEEE Transactions on Signal Processing, vol. 39, No. 3, Mar. 1991, pp. 723-727.

Mark Nixon et al., "Feature Extraction and Image Processing" Academic Press, 2008, pp. 1-100.

Linda Shapiro et al., "Computer Vision" (1st ed.). Prentice Hall PTR, Upper Saddle River, NJ, USA, 2001, pp. 1-609.

* cited by examiner

300

1: Inputs:
   Enter the samples of a given time series signal $\{x_k\}$, space of base models $T = \{T_q\}$, horizon of prediction $h$, and window size $W$ with $(k = 1, \ldots, N)$ and $(q = 1, 2, \ldots, Q)$ 2: Initialize:
   Parameters set $\alpha$ of models.

3: $I \leftarrow \text{len}\{x_k\}$

4: $i \leftarrow 0$

5: $X_i \leftarrow X_{i:i+W}$

6: $Y_i \leftarrow X_{i+W+h}$

7: repeat

8: $\quad i \leftarrow i + 1$

9: $\quad X_i \leftarrow X_{i:i+W}$

10: $\quad Y_i \leftarrow X_{i+W+h}$

11: until $i > I - W - h$

12: Compose the training set $X \leftarrow \{X_i\} \leftarrow \{Y_i\}$

13: Compute all $S_q$ such that $s \in S_q \Rightarrow s \in T$

14: $S \leftarrow \{S_q\}$

15: $P \leftarrow \text{len}(S)$

16: $q \leftarrow 0$

17: $R^* \leftarrow 0$

18: repeat

19: $\quad$ Fit voting regression of $S_q(\alpha, X, Y)$

20: $\quad$ Compute the corresponding $R^2$ score $R^2(S_q, \alpha, X, y)$

21: $\quad$ if $R^* < R^2(S_q, \alpha, X, Y)$ then

22: $\quad\quad R^* \leftarrow R^2(S_q, \alpha, X, Y), S^* \leftarrow S_q, \alpha^* \leftarrow \alpha$ 23: $\quad$ end if

24: $\quad q \leftarrow q + 1$

25: until $q \geq P$

26: Outputs:
   $S^*, \alpha^*, R^*$

1: Inputs:
   Enter the samples of a given time series signal $\{x_k\}$, space of base models $T = \{T_q\}$, horizon of prediction $h$, SOMC model collection $S^*$, and window size $W$ with $(k = 1, \ldots, N)$ and $(q = 1, 2, \ldots, Q)$ 2: Initialize:
   Parameters set $\alpha$ of SOMC model collection, step size increment $m$, upper bound of $\overline{m}$, and $\sigma \leftarrow 0$.

3: $R^* \leftarrow 0$
4: repeat
5:     $\sigma \leftarrow \sigma + m$
6:     Compute filtered signal $x_k^f \leftarrow x_k * g(\sigma, x_k)$
7:     $I \leftarrow \text{len}\{x_x^f\}$
8:     $i \leftarrow 0$
9:     $X_i^f \leftarrow x_{i:i+W}^f$
10:     $Y_i \leftarrow x_{i+W+h}$
11:     repeat
12:         $i \leftarrow i + 1$
13:         $X_i^f \leftarrow x_{i:i+W}^f$
14:         $Y_i \leftarrow x_{i+W+h}$
15:     until $i > I - W - h$
16:     Compose the training set $X^f(\sigma) \leftarrow \{X_i^f\}, Y \leftarrow \{Y_i\}$
17:     Fit voting regression of $S^*(\alpha, X^f(\sigma), Y)$
18:     Compute the corresponding $R^2$ score
19: $R^2(S_q, \alpha, X^f(\sigma), Y)$
20:     if $R^* < R^2(S_q, \alpha, X^f(\sigma), Y)$ then
21:         $R^* \leftarrow R^2(S_q, \alpha, X^f(\sigma), Y), \sigma^* \leftarrow \sigma, \alpha^* \leftarrow \alpha$
22:     end if
23: until $\sigma \geq \overline{m}$
24: Outputs:
25:     $\sigma^*, \alpha^*, R^*$

1: Inputs:
   Enter the samples of a given time series signal $\{x_k\}$, space of base models $T = \{T_q\}$, horizon of prediction $h$, and SOMC model collection $S^*$ with $(k = 1, \ldots, N)$ and $(q = 1, 2, \ldots, Q)$
2: Initialize:
   Parameters set $\alpha$ of SOMC model collection, step size increment $w$, upper bound of $\overline{W}$, and $w^* \leftarrow 0$.
3: $R^* \leftarrow 0$
4: repeat
5: $\quad W \leftarrow W + w$
6: $\quad I \leftarrow \text{len}\{X_k\}$
7: $\quad i \leftarrow 0$
8: $\quad X_i \leftarrow x_{i:i+w}$
9: $\quad Y_i \leftarrow x_{i+w+h}$
10: $\quad$ repeat
11: $\quad\quad i \leftarrow i + 1$
12: $\quad\quad X_i \leftarrow x_{i:i+w}$
13: $\quad\quad Y_i \leftarrow x_{i+w+h}$
14: $\quad$ until $i > I - W - h$
15: $\quad$ Compose the training set $X(\sigma) \leftarrow \{X_i\}, Y \leftarrow \{Y_i\}$
16: $\quad$ Fit voting regression of $S^*(\alpha, X(W), Y)$
17: $\quad$ Compute the corresponding $R^2$ score $R^2(S_q, \alpha, X(\sigma), Y)$
18: $\quad$ if $R^* < R^2(S_q, \alpha, X(W), Y)$ then
19: $\quad\quad R^* \leftarrow R^2(S_q, \alpha, X(W), Y), W^* \leftarrow W, \alpha^* \leftarrow \alpha$
20: $\quad$ end if
21: until $W \geq \overline{W}$
22: Outputs:
   $W^*, \alpha^*, R^*$

FIG. 5

SYSTEMS AND METHODS FOR GENERATING OPTIMAL DATA PREDICTIONS IN REAL-TIME FOR TIME SERIES DATA SIGNALS

FIELD OF THE INVENTION

Embodiments of the invention generally relate to generating optimal data predictions in real-time for time series data signals.

BACKGROUND

Time series data is notoriously difficult to use for many modeling applications. For example, time series data from different domains exhibit considerable variations in important properties and features, temporal scales, and dimensionality. Therefore, obtaining data for generating a prediction for a particular application is typically limited to data related to that application. Accordingly, data for use in generating a model for an application is typically limited. This is especially true for models that implement artificial intelligence, including machine learning, neural networks, etc. (referred to collectively herein as "machine learning models" or simply "models") as models for artificial intelligence typically require some level of training using existing data. Due to the limited training data, the ability to optimize these models is also limited. Unfortunately, conventional data augmentation techniques have limited applicability to time series data due to the need to maintain a temporal segmentation of the data, and the over-reliance on augmented time series data leads to poor modeling results. Additionally, as different sets of time series data from different domains exhibit considerable variations in important properties and features, temporal scales, and dimensionality, the combinations of characteristics for a model that provide the best predictions for one application (e.g., which components, algorithms, parameters, etc.) may differ from another application.

SUMMARY

In view of the above, methods and systems for generating optimal data predictions in real-time for time series data signals is described. In particular, these methods and systems provide optimal data predictions in time series data signals irrespective of data scarcity issues and across a diverse spectrum of applications. For example, optimal selection of base models, window size, and/or Gaussian filter enhances the generalization ability of the model, which relaxes the need for sizable datasets for developing models making the technique to be applicable to both small and large datasets. Moreover, the methods and systems described herein generate optimal data predictions in time series data signals based on empirically-optimized model selection, noise filtering, and window size selection using machine learning models, which provides improved classification, regression, and distribution approximation as well as optimal anomaly and outlier detection. Notably, the methods and systems provide these advantages in numerous applications such as load processing in disparate computer networks, electromyography signals modeling, computer vision-based human motion modeling, and robotic assembly processes.

As discussed above, one technical hurdle to overcome when generating optimal data predictions in real-time for time series data signals is the need to find an optimal model. Given the limited data and the uniqueness of each data set and/or application, the optimal model for a given application may differ. The methods and systems described herein overcome this problem through the use of a model that selects an optimal collection of an ensemble of available models. For example, as opposed to simply optimizing a model, the methods and systems optimize the process for selecting the optimal model. However, upon selecting from a set of different models, an additional technical problem arises, namely, that in some instances the most optimal model may be a combination of multiple models as opposed to a single model from the group. In view of this, the methods and systems provide a model beyond that of a conventional voting ensemble. In particular, the methods and systems described herein select an optimal base model collection for the ensemble of base models. Not only may the optimal base model collection comprise one or more models, but the ensemble of base models may comprise all permutations of individual models and models based on combinations of all the permutations of the individual models, thus maximizing the ability of the system to select the optimal collection in an empirical manner.

However, the use of a base model collection raises an additional technical hurdle, namely determining an optimal parameter for this base model collection. For example, while parameters for a model (or collection of base models) may be independently optimized, such optimization increases the overall time to train a model. This is particularly problematic when attempting to generate optimal data predictions in real-time for time series data signals. For example, optimal data predictions for time series data are dependent on the recentness of the data—the more recent the data, the higher the confidence level in predictions for a given prediction horizon. For real-time predictions, this means that the most recent data may be current data. Using this data means that any optimization (if performed on the current data) needs to also be performed in real-time. Independently optimizing parameters after an optimal model collection is determined creates an additional processing burden and delays the final output of the base model collection and parameters for the base model collection. To overcome this technical problem, the systems and methods optimize the base model collection and the parameter together.

While this simultaneous optimization provides for improved optimal data predictions in real-time for time series data signals, it raises another technical hurdle. Specifically, time series data signals may be noisy and thus require some type of noise suppression. In such cases, similar to optimizing both the collection of base models and parameter therefor as discussed above, additional pre-processing for noise suppression creates an additional processing burden. Furthermore, tuning filters parameters is a time-consuming task that adds further complexity to the filtering process. The suggested methods and systems overcome this technical hurdle by plugging filter parameters, used for the noise suppression, into the optimization process. However, this type of parallel optimization creates numerous variables, the number of which both increase the complexity of optimization and negatively affect real-time performance. To overcome such complexity aspect, the methods and systems may use a model component for noise suppression that may be implemented with only a single parameter (e.g., using a model component comprising a Gaussian smoothing filter). The use of a single parameter in the noise suppression/reduction allows for this parameter to be optimized in concert with the other optimizations (e.g., the creation of an optimal parameter set) without negatively affecting performance. In contrast, conventional noise reduction techniques such as root mean square filter, median filter, or Kalman filter may capture spatial features of a given signal leading to potential limited performance.

To further improve optimal data predictions in real-time for time series data signals, the methods and systems may also select an optimal window size for the given time series data and given prediction horizons. For example, as described above, time series data from different domains exhibit considerable variations in important properties and features, temporal scales, and dimensionality. In order to overcome bias from these variations, the methods and systems may further optimize a window size of data to generate optimal predictions. The use of an optimal window size allows for the predictions to be based on data that reduce bias. Furthermore, as the optimal window size may change based on either the time series data (e.g., or domain thereof) or a given prediction horizon, the methods and systems may optimize the window size based on the time series data. Accordingly, the methods and systems may implement a model component featuring variables that include values of a subset of time series data, a prediction horizon, and/or an optimal parameter set (e.g., parameters for other model components). The use of these overlapping parameters and the coordination of optimizations allows for generating optimal data predictions in real-time for time series data signals without negatively affecting performance.

In some aspects, the methods and systems generate optimal data predictions in time series data signals based on empirically-optimized model selection, noise filtering, and window size selection. For example, the system may receive a first subset of time series data. The system may receive a prediction horizon. The system may generate a feature input based on the first subset of time series data and the prediction horizon. The system may input the feature input into a machine learning model, wherein the machine learning model includes: a first model component, wherein the first model component is trained to select, for given time series data and given prediction horizons, an optimal collection of models for the ensemble of base models and select an optimal parameter set for the optimal base model collection; a second model component, wherein the second model component is trained to select a filtering parameter for the given time series data and given prediction horizons; and a third model component, wherein the third model component is trained to select an optimal window size for the given time series data. The system may receive an output from the machine learning model. The system may generate for display, on a user interface, a prediction for the first subset of time series data at the prediction horizon based on the output.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 3 is an illustrative pseudocode for empirically-optimized model selection, in accordance with one or more embodiments.

FIG. 4 is an illustrative pseudocode for empirically-optimized noise filtering, in accordance with one or more embodiments.

FIG. 5 is an illustrative pseudocode for empirically-optimized window size selection, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
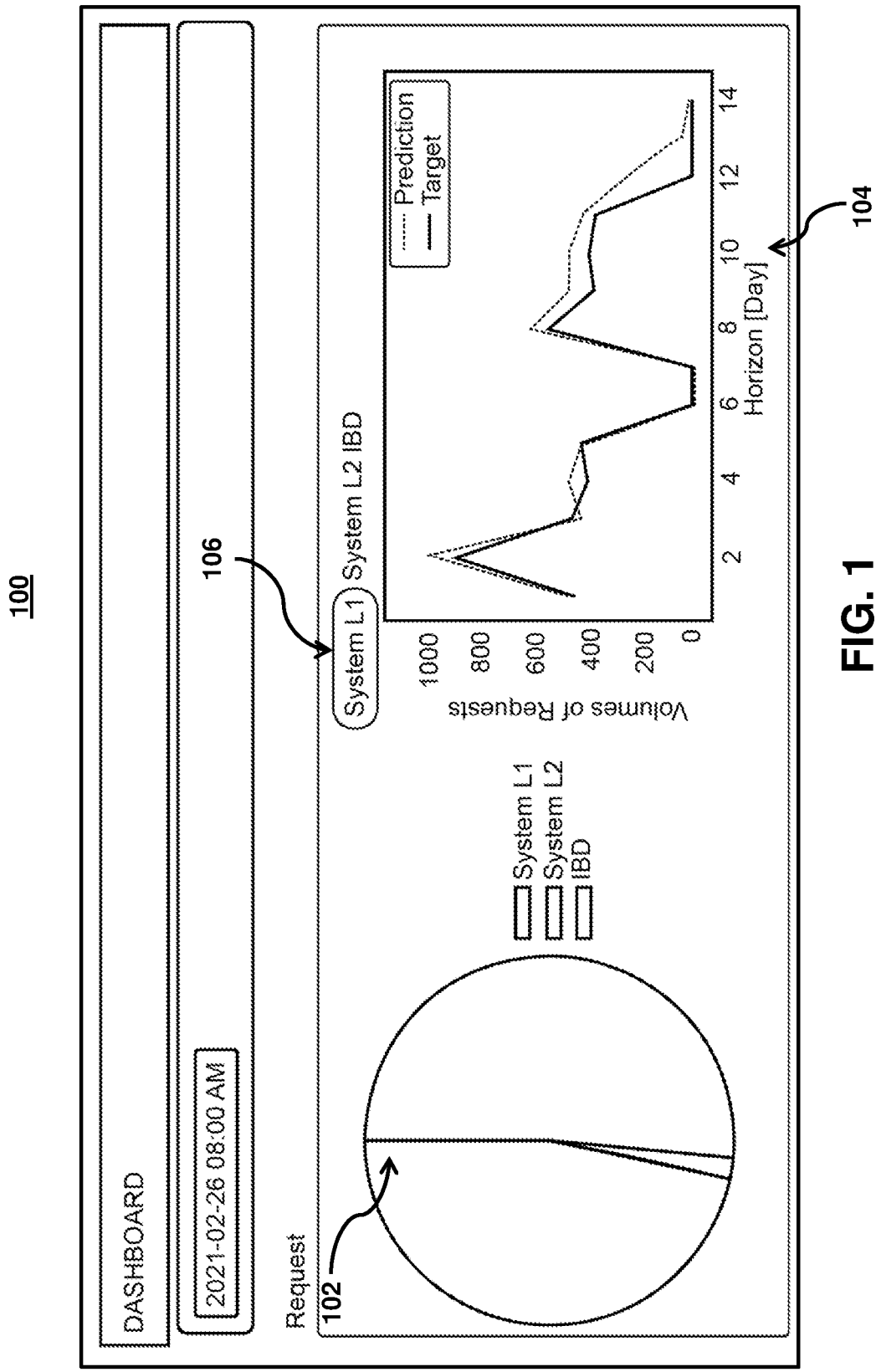
FIG. 1 shows an illustrative user interface for presenting data predictions in time series data signals based on empirically-optimized model selection, noise filtering, and window size selection using machine learning models, in accordance with one or more embodiments.

FIG. 1 shows an illustrative user interface for presenting data predictions in time series data signals based on empirically-optimized model selection, noise filtering, and window size selection using machine learning models in accordance with one or more embodiments. For example, optimal selection of base models, window size, and/or Gaussian filter enhances the generalization ability of the model, which relaxes the need for sizable datasets for developing models making the technique to be applicable to both small and large datasets. For example, FIG. 1 includes user interface 100, which presents content based on data predictions for time series data signals. As referred to herein, "time series data" may include data that is stored sequentially and/or with a temporal element. For example, a time series may include a series of data points indexed in time order. In some embodiments, time series data may also include a sequence taken at successive equally spaced points in time.

The following references, which include further elaboration and/or details on one or more feature of components for data predictions in time series data signals based on empirically-optimized model selection, noise filtering, and window size selection using machine learning models, are incorporated by reference in their entirety, R. A. Haddad and A. N. Akansu, "A class of fast Gaussian binomial filters for speech and image processing," in IEEE Transactions on Signal Processing, vol. 39, no. 3, pp. 723-727, March 1991, doi: 10.1109/78.80892; L. G. Shapiro and G. Stockman, Computer Vision (1st ed.). Prentice Hall PTR, Upper Saddle River, NJ, USA, 2001; M. S. Nixon and A. S. Aguado. Feature Extraction and Image Processing. Academic Press, 2008; E. Elboher and M. Werman, "Efficient and accurate Gaussian image filtering using running sums," Computing Research Repository, vol. abs/1107.4958, 2011. http://arxiv.org/abs/1107.4958; P. Gwosdek, S. Grewenig, A. Bruhn, J. Weickert, "Theoretical foundations of Gaussian convolution by extended box filtering," International Conference on Scale Space and Variational Methods in Computer Vision, pp. 447-458, 2011. http://dx.doi.org/10.1007/978-3-642-24785-9_38; I. F. Ghalyan, Force-Controlled Robotic Assembly Processes of Rigid and Flexible Objects: Methodologies and Applications. Springer, Cham, Switzerland, 2016, ISBN: 978-3-319-39184-7; I. F. Ghalyan, Z. M. Abouelenin and V. Kapila, "Gaussian Filtering of EMG Signals for Improved Hand Gesture Classification," Proc. 2018 IEEE Signal Processing in Medicine and Biology Symposium (SPMB), Philadelphia, PA, 2018, pp. 1-6, doi: 10.1109/SPMB.2018.8615596; and I. F. Ghalyan, Z. M. Abouelenin, G. Annamalai and V. Kapila, Gaussian Smoothing Filter for Improved EMG Signal Modeling. In: Obeid I., Selesnick I., Picone J. (eds) Signal Processing in Medicine and Biology. Springer, Cham, Switzerland, 2020. https://doi.org/10.1007/978-3-030-36844-9_6.

User interface 100 includes content 102, which appears as a graphical representation based on data predictions. For example, content 102 may include any content based on, or related to (e.g., a confidence level of a prediction), based on data predictions. As referred to herein, "content" may include, and the embodiments described herein are applicable to any electronically consumable content, such as television programming, Internet content (e.g., streaming content, downloadable content, webcasts, etc.), video clips, audio, text and/or textual data, metadata, pictures, images, scanned documents, playlists, websites, articles, books, electronic books, blogs, advertisements, chat sessions, social media, applications, games, and/or any other media or multimedia and/or combination of the same. As described herein, users may access this content via a user interface. As referred to herein, a "user interface" may comprise a human-computer interaction and communication in a device, and may include display screens, keyboards, a mouse, and the appearance of a desktop. For example, a user interface may comprise a way a user interacts with an application or a website, the mechanism in which the user interacts, and/or a portion of a screen within which the user interacts.

As shown in FIG. 1, user interface 100 also includes icon 106. For example, icon 106 may allow a user to select different subsets of data and/or predictions. For example, icon 106 may allow a user to select a first application over a second. User interface 100 may also indicate other information about time series data. The one or more predictions may also include a rationale and/or information regarding why a prediction was triggered (e.g., the one or more metrics and/or threshold differences that caused the prediction). As referred to herein, a prediction may include any communication of information that is communicated to a user. For example, a prediction may be any communication that conveys information in a quantitative or qualitative manner, include values, rates of change, and/or differences in value as well as danger, threats, or problems, typically with the intention of having it avoided or dealt with. Similarly, a prediction may be any communication that conveys an opportunity and/or recommends an action. For example, the system may provide predictions for numerous applications such as load processing in disparate computer networks, electromyography signals modeling, computer vision-based human motion modeling, and robotic assembly processes.

For example, icon 106 may allow a user to filter time series and/or domains of time series data based on a time period (e.g., a month, date, year), a data source (e.g., a given digital archive, a given website, a given governmental database, a given news outlet, etc.), a type of data source (e.g., a type of digital archive, a type of website, a type of governmental database, a type of a news outlet, etc.), an entity (e.g., a given company, a given person, a given industry, etc.), a type of entity (e.g., a type of company, a type of person, a type of industry, etc.), a sentiment (e.g., a positive, negative, and/or neutral sentiment), a location within a data (e.g., a particular section of a document, a particular section of a webpage, a particular section of news content, a particular subject matter/topic, etc.), and/or based on one or more preexisting tags in the data set (e.g., tags automatically related data to a time period, data source, type of data source, entity, type of entity, and/or sentiment. Moreover, the system may generate alerts based on this information. For example, the system may continuously monitor (e.g., at a user-selected time increment) for changes to time series data (e.g., abrupt change and/or trends), subject matter or entities (e.g., a company, person, etc.) for changes, and/or degrees of change (e.g., changes above a given threshold) related to the time series data. The alert may be configured using multiple criteria to determine when, where, how, and/or to whom an alert is generated. Furthermore, in some embodiments, an alert may be used to trigger the generation of data predictions in time series data signals based on empirically-optimized model selection, noise filtering, and window size selection using machine learning models.

As one example, user interface 100 may include a data processing request example as shown in graph 104. For example, the system may be configured to generate optimal data predictions in real-time for time series data signals related to load processing in disparate computer networks based on empirically-optimized model selection, noise filtering, and window size selection using machine learning models. In such cases, the system may retrieve a plurality of available domains, retrieve a plurality of processing requests, wherein each respective processing request has an initial estimated processing load, and monitor a respective excess processing load for each of the plurality of available domains, wherein the respective excess processing load comprises an amount of processing load availability on a domain of the plurality of available domains. In some embodiments, the plurality of processing requests may correspond to processing functions for applications or programs that need to be performed (e.g., in a client-server arrangement). For example, each processing request may comprise a request, by a client device, to use the functions (e.g., processing power and/or resources) of a domain (e.g., a server). The system may then balance the load that the plurality of processing requests comprises between the various available domains. In such cases the respective excess processing load may comprise an amount of processing load availability on a domain of the plurality of available domains that remains after one or more processing requests have been assigned to a given domain and/or the plurality of available domains as a whole. The system may continuously and/or periodically monitor (e.g., via queries to individual domains) the changes to the processing loads and excesses thereof.

In some embodiments, the processing requests may correspond to comprise other divisions and/or distinctions between one or more products or services that need to be assigned to a given domain. For example, in some embodiments, where a domain comprises, or correlates to a financial service or deal, the processing requests may comprise one or more material or immaterial products or services that need to be assigned to the domain. For example, the processing request may comprise collateral items (or electronic designations of collateral items) that need to be assigned to one or more deals. In such cases, the excess processing load may comprise an amount of (e.g., in terms of monetary value) shortfall or difference in the value of the collateral items and the value required by the deal. For example, the excess processing load may comprise the uncollateralized portion comprises an amount of shortfall of a price of the collateral on a deal of the plurality of available deals. In another example, processing requests may correspond to a cost to carry for each of the plurality of available deals, wherein the respective cost to carry comprises a sum price of collateral items on a deal of the plurality of available deal. Additionally or alternatively, the initial estimated processing load for each of the plurality of processing requests may comprise a price (e.g., monetary value) of a given collateral item, collateral par in dealer box, a market value, rating, or rule. The system may also detect changes in the processing load in response to price changes, collateral par in dealer box being reduced, market value or rating changes that triggered concentration limit breach, or rule changes triggered eligibility breach, etc. The system may continuously and/or periodically monitor (e.g., via queries to one or more internal and/or third-party sources) the changes to the processing loads and excesses thereof (e.g., based on continuously received new real-time data).

The system may then provide predictions for processing load at a given prediction horizon. As referred to herein, a prediction horizon may include a value that indicates how far ahead the model predicts the future. For example, when the prediction horizon is well matched to the lag (e.g., window size) between input and output, the user learns how to control the system more rapidly and achieves better performance. For example, a prediction horizon may be set at a given hour, day, month, etc. In some embodiments, the prediction horizon may be set based on a given application. For example, having adequate demand response in data centers (e.g., relates to network processes, energy use, data transmission/communication) is vital to the operation of data center demand response management. If the demand response may be planned and distributed across an entire day, the system is uniquely positioned to respond to use renewable energy resources whose supplies are intermittent throughout the day. In such cases, the system may set the prediction horizon as a day ahead (or an amount of time that allows for adequately addressing detected issues).

For example, the systems and methods may generate predictions (e.g., indicating abrupt changes, likely changes, and/or other discrepancies in one or more values) based on changes of a metric (e.g., a value associated with time series data). The predictions may be applied to multiple embodiments (e.g., any embodiments featuring time series data).

In some embodiments, the prediction may include a predicted set of values for time series values and a confidence level for each of the predicted set of values for time series values. For example, the confidence level may comprise a range of values for an unknown parameter (e.g., accuracy) or a likely value of the unknown parameter. The confidence level that gives the probability with which an estimated interval will contain the true value of the parameter. In some embodiments, the system may determine the confidence level based on a sample size, percentage, and/or population size.

In another example, the system may generate predictions in order to assist operations managers/supervisors, by visualizing volumes of operational activities of each process of operation and operational processes. For example, a given request may include numerous operational processes each with one or more operational activities. Through user interface 100, operations managers/supervisors may receive predictions and/or information related to available resources and processes.

User interface 100 may provide a dashboard with predictive ability that can use historical data to forecast operational volumes of activities and processes. Such predictive ability may assist operations managers/supervisors to plan ahead of time required number of full-time equivalents ("FTEs") to accomplish these operational activities, may support operations managers/supervisors to meet required service level agreement ("SLA") that might lead to monetary penalties if not met, and may help operations managers/supervisors to attain required target completion time ("TCT") that might lead to reputational risks if not attained. In such cases, time series data may comprise historical volumes of an activity of a process as a time series signal. For example, graph 104 may provide forecasting for fourteen days of volumes of requests ahead of time (e.g., both as a prediction and a target).

Figure 2:
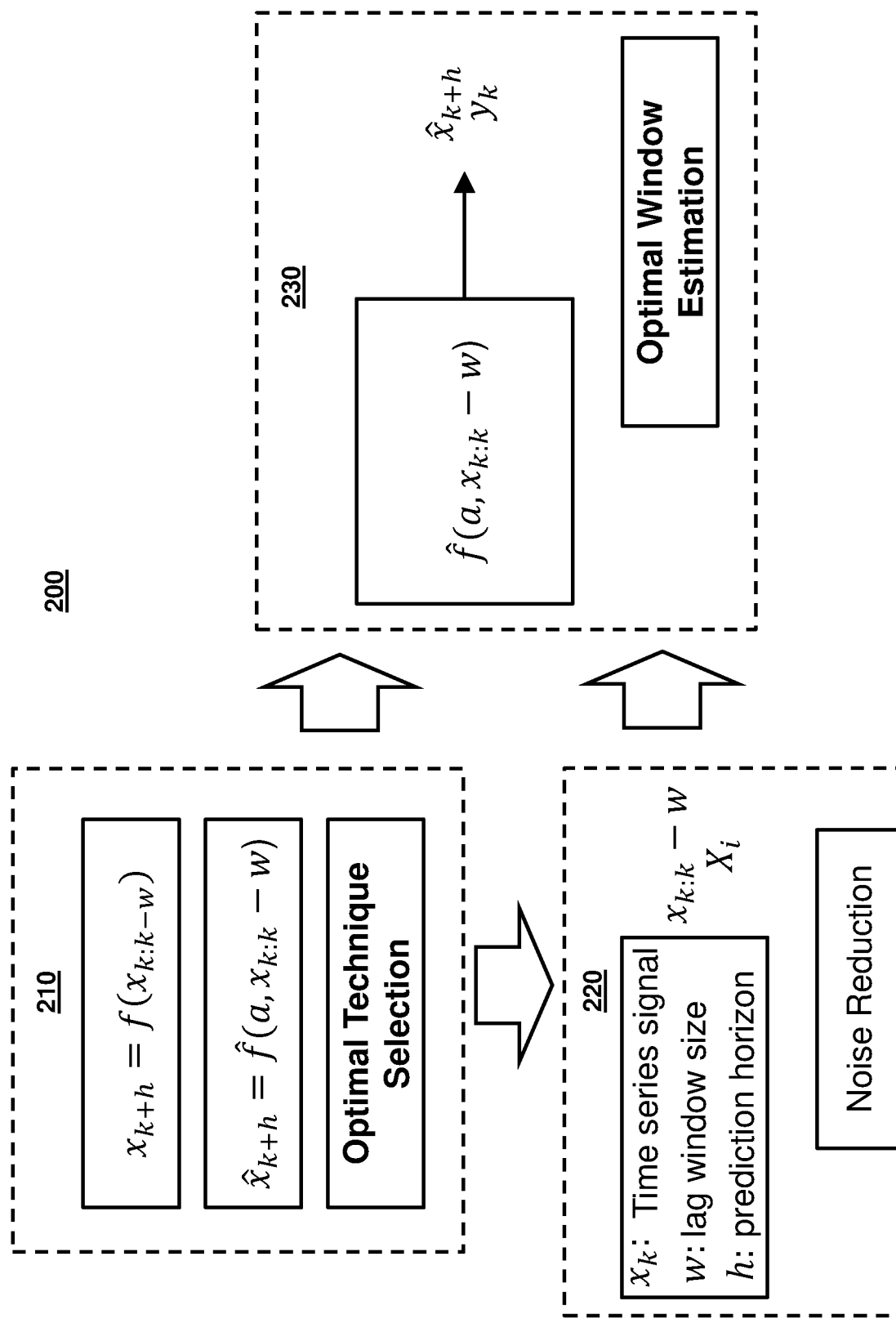
FIG. 2 shows an illustrative system diagram for generating optimal data predictions in time series data signals using machine learning models, in accordance with one or more embodiments.

FIG. 2 shows an illustrative system diagram for generating optimal data predictions in time series data signals using machine learning models, in accordance with one or more embodiments. As shown, in FIG. 2 the architecture of the model allows for the splitting of algorithm so that they do not need to be cascaded and/or can be interchanged. For example, diagram 200 shows an illustrative display of a model (e.g., a machine learning model or other model) that features three model components. Diagram 200 includes component 210, component 220, and component 230. For example, diagram 200 shows a data-driven mechanism for optimal selection of forecasting model, window size, and noise suppression.

For example, component 210 includes an optimal model selection algorithm. As indicated in component 210, a next value in the time series may be predicted as a function of a time series signal, $x_k$, where h comprises a prediction window, W comprises a lag window size, and $\alpha$ indicates a model parameter. As shown below:

$$x_{k+h} = f(x_{k:k-W})$$

$$\hat{x}_{k+h} = f(\alpha, x_{k:k-W})$$

The system may then determine an optimal model for use in generating optimal data predictions using a voting ensemble that may consider outputs of individual models, combinations of multiple base models, and/or average predictions of individual models. For example, the system may use a data-driven selection of optimal modeling collection to forecast a time series signal. For example, component 210 may comprise a first model component, wherein the first model component is trained to select, for given time series data and given prediction horizons, an optimal base model collection for the ensemble of base models and select an optimal parameter set for the optimal base model collection.

The optimal base model collection may comprise a selection of models from an ensemble of available models. For example, the ensemble of base models may comprise individual models and models based on combinations of the individual models. These individual models may comprise model based on Linear Regression ("LR"), Bayesian Regression ("BR"), Ridge ("RG"), a Multi-Layer Perceptron ("MLP"), Elastic Net ("EL"), Gradient Boosting Regression ("GBR"), and/or Random Forest Regression ("RFR"). Additionally or alternatively, to generate the ensemble of base models, the system may generate one or more combinations of individual base models and/or all permutations of individual models and models based on combinations of all the permutations of the individual models. For example, the system may determine several possible variations, in which a set or number of base models can be ordered or arranged (e.g., in series and/or in parallel). Thus an optimal selection of base models is determined empirically as will be detailed below.

For example, component 210 may use a process where multiple diverse models are created to predict an outcome, either by using many different modeling algorithms or using different training data sets. The ensemble model then aggregates the prediction of each base model and results in once final prediction for the unseen data. The system may use the ensemble models to reduce the generalization error of the prediction. For example, as long as the base models are diverse and independent, the prediction error of the model decreases when the ensemble approach is used. The approach seeks the wisdom of crowds in making a prediction. Even though the ensemble model has multiple base models within the model, it acts and performs as a single model.

As shown below, S comprises a base model collection, and the system may determine the various models and combination of models that comprise the various collections of base models:

$$S = \{\{T_1\}, \{T_2\}, \ldots, \{T_N\}, \{T_1, T_2\}, \ldots, \{T_1, T_2, \ldots, T_Q\}\}$$
$$\quad\quad S_1 \quad S_2 \quad\quad\quad \ldots \quad\quad\quad S_P$$

The system may then empirically determine an optimal base model collection as shown below $\alpha^*$ comprises an optimal parameter for the optimal base model collection $S^*$:

$$R_{emp}(\alpha, Y, X) = \frac{1}{N}\sum_{i=1}^{N}(Y_i - \hat{f}(\alpha, X_i))^2$$

$$R_{emp}(S_p, \alpha, Y, X) = \frac{1}{N}\sum_{i=1}^{N}(Y_i - S_p(\alpha, X_i))^2$$

$$\alpha^*, S^* = \operatorname{argmin} R_{emp}(S_p, \alpha, Y, X)$$
$$\quad\quad \alpha^* \in \alpha, S^* \in \{S_i\}$$

$$\alpha^*, S^* = \operatorname{argmax} R^2(S_p, \alpha, y, x)$$
$$\quad\quad \alpha^* \in \alpha, S^* \in \{S_i\}$$

FIG. 3 is an illustrative pseudocode for empirically-optimized model selection, in accordance with one or more embodiments. For example, pseudocode 300 indicates pseudocode that may be used to generate optimal data predictions in some embodiments, and in particular selection an optimal collection of base models. For example, through the use of pseudocode 300, the system may provide optimal selection of base models, window sizes, and/or Gaussian filters, which enhances the generalization ability of the model, and which relaxes the need for sizable datasets for developing models making the technique to be applicable to both small and large datasets.

Diagram 200 (FIG. 2) also includes component 220. Component 220 may comprise a noise reduction component for a model shown in diagram 200. As shown in diagram 200, in some embodiments, component 220 may be used in parallel or in series with component 210. Component 220 is applicable to both stationary noise and non-stationary noise (e.g., non-stationary noise with all non-stationarity features contained in the training set). As described herein, stationary noise is noise with a normal distribution that has a constant mean and standard deviation. Component 220 also provides Gaussian time and frequency responses and simultaneous attenuation of noise while partially keeping high frequency information (which may be lost in some filtering techniques). Furthermore, as discussed below, the empirical risk minimization enhances capturing high frequency components of information.

In some embodiments, component 220 comprises the use of a Gaussian smoothing filter (although it should be noted that other noise reduction techniques may additionally or alternatively be used). For example, the Gaussian smoothing filter (and in particular the empirically optimized Gaussian smoothing filter) provides for improved noise suppression performance, implementation with only one parameter, and allows for regression/classification performance enhancement by capturing the spatial nature of considered signals (e.g., a regression/classification performed by component 210). For example, the system may apply a Gaussian smoothing filter as shown below, wherein σ represents the smoothing filter:

$$x_k^f = x_k * g(\sigma, x_k)$$

$$g(\sigma, x_k) = \frac{\exp\left(-\frac{(x_k)^2}{2\sigma^2}\right)}{\sqrt{2\pi\sigma^2}}$$

Similar to component 210, the system may empirically determine an optimal base model collection; however, as shown below, the system may also determine an optimal Gaussian smoothing filter parameter, $\sigma^*$:

$$R_{emp}(\alpha, \sigma, Y, X) = \frac{1}{N}\sum_{i=1}^{N}(Y_i - \hat{f}(\alpha, X_i^f(\sigma)))^2$$

$$R_{emp}(S_p, \alpha, \sigma, Y, X) = \frac{1}{N}\sum_{i=1}^{N}(Y_i - S_p(\alpha, X_i^f(\sigma)))^2$$

$$\alpha^*, S^*, \sigma^* = \operatorname{argmin} R_{emp}(S_p, \alpha, \sigma, Y, X)$$
$$\quad\quad \alpha^* \in \alpha, S^* \in \{S_i\}, \sigma^* \in \sigma$$

$$\alpha^*, S^*, \sigma^* = \operatorname{argmax} R^2(S_p, \alpha, y, x)$$
$$\quad\quad \alpha^* \in \alpha, S^* \in \{S_i\}, \sigma^* \in \sigma$$

FIG. 4 is an illustrative pseudocode for empirically-optimized noise filtering, in accordance with one or more embodiments. For example, pseudocode 400 indicates pseudocode that may be used to generate optimal data predictions in some embodiments, and in particular provide optimal noise filtering. For example, through the use of pseudocode 400, the system may provide optimal selection of base models, window sizes, and/or Gaussian filters, which enhances the generalization ability of the model, and which relaxes the need for sizable datasets for developing models making the technique to be applicable to both small and large datasets.

Diagram 200 (FIG. 2) also includes component 230. Component 230 may comprise a noise reduction component for a model shown in diagram 200. As shown in diagram 200, in some embodiments, component 230 may receive outputs from an ensemble of component 210 and component 220 in parallel or in series. Also similar to component 210, the system may empirically determine an optimal base model collection; however, as shown below, the system may also determine an optimal lag window size, W*:

$$R_{emp}(\alpha, W, Y, X) = \frac{1}{N}\sum_{i=1}^{N}(Y_i - \hat{f}(\alpha, X_i^f(W)))^2$$

$$R_{emp}(\alpha, W, Y, X) = \frac{1}{N}\sum_{i=1}^{N}(Y_i - S^*(\alpha, X_i(W)))^2$$

$$\alpha^*, W^* = \operatorname*{argmin}_{\alpha^* \in \alpha, W^* \in W} R_{emp}(S^*, \alpha, W, Y, X)$$

$$\alpha^*, W^* = \operatorname*{argmax}_{\alpha^* \in \alpha, W^* \in W} R^2(S^*, \alpha, W, Y, X)$$

FIG. 5 is an illustrative pseudocode for empirically-optimized window size selection, in accordance with one or more embodiments. For example, pseudocode 500 indicates pseudocode that may be used to generate optimal data predictions in some embodiments, and in particular determine an optimal window size. For example, in some embodiments, the optimal window algorithm does not include the optimal noise filtering parameter.

Figure 6:
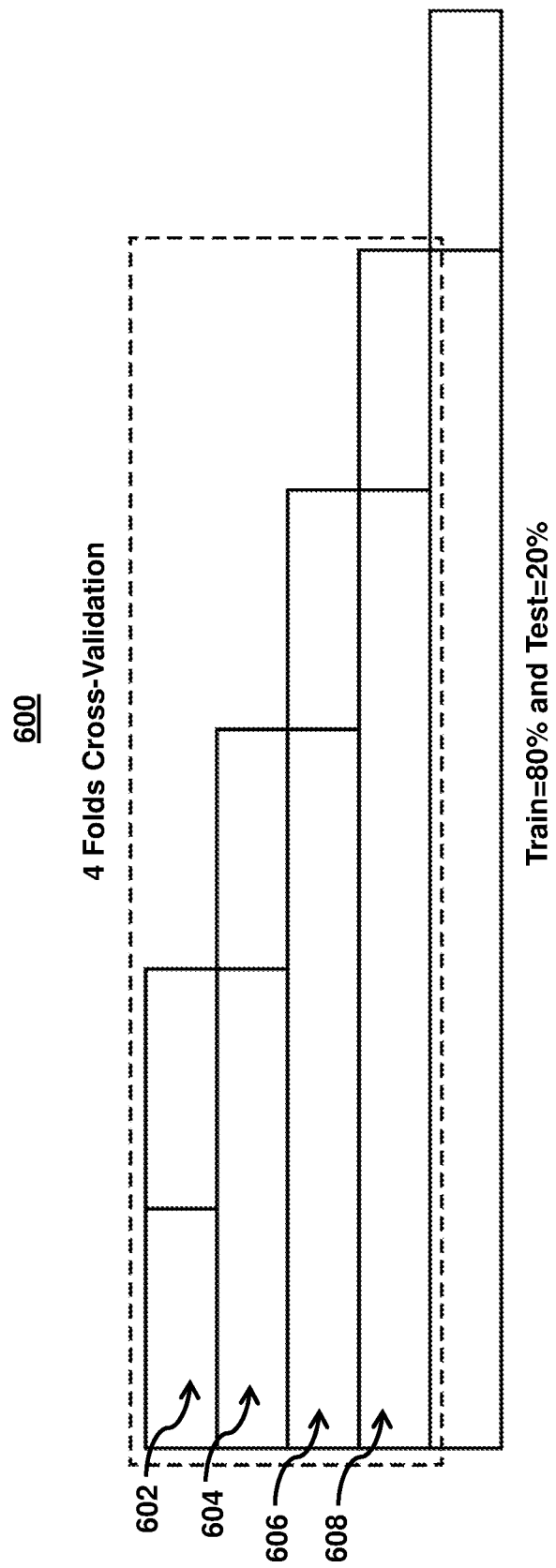
FIG. 6 shows an illustrative diagram of validations techniques for machine learning models used to generate optimal data predictions in time series data signals based on empirically-optimized model selection, noise filtering, and window size selection, in accordance with one or more embodiments.

FIG. 6 shows an illustrative diagram of validations techniques for machine learning models used to generate optimal data predictions in time series data signals based on empirically-optimized model selection, noise filtering, and window size selection, in accordance with one or more embodiments. For example, FIG. 6 includes diagram 600, which shows a four step cross-validation technique used to validate a model. The use of four step cross-validation allows for improved training in data sparse environments. Moreover, as opposed to conventional cross-validation, the system maintains the temporal ordering of the data series. In some embodiments, the machine learning model may use four-fold cross-validation for validation purposes during training.

For example, the system may use cross-validation to evaluate a model and/or model component by partitioning the original sample into a training set to train the model, and a test set to evaluate it. As shown in diagram 600, the system may use one-third of available data for validation 602. The system may also start with the oldest available data and proceed to later available data in order to maintain the temporal nature of the data (and any relationships that are presented by the temporal information). The system may then iteratively increase the amount of data (e.g., for validation 604, validation 606, and validation 608) in one sixth increments.

For example, in k-fold cross-validation, the original sample is partitioned into k equal size sub samples. Of the k subsamples, a single subsample is retained as the validation data for testing the model, and the remaining k−1 subsamples are used as training data. The cross-validation process is then repeated k times (the folds), with each of the k subsamples used exactly once as the validation data. The k results from the folds can then be averaged (or otherwise combined) to produce a single estimation. The advantage of this method is that all observations are used for both training and validation, and each observation is used for validation exactly once. By maintaining the temporal relationships of the data, and partitioning the data in temporal order, the system allows the model train itself on detected temporal relationships.

Figure 7:
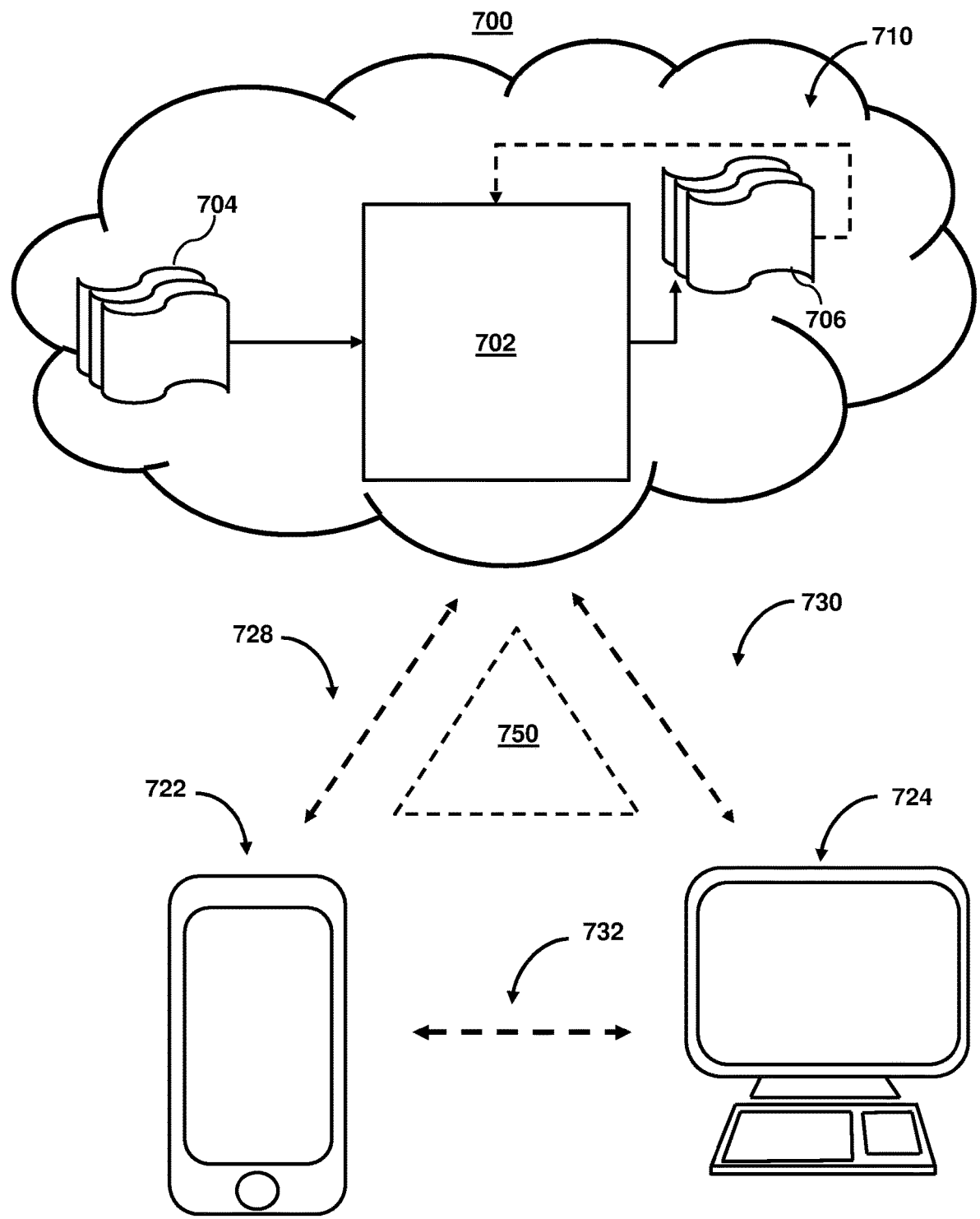
FIG. 7 shows system components for generating optimal data predictions in time series data signals based on empirically-optimized model selection, noise filtering, and window size selection, in accordance with one or more embodiments.

FIG. 7 is an illustrative system architecture for generating optimal data predictions in time series data signals, in accordance with one or more embodiments. For example, system 700 may represent the components used for generating optimal data predictions, as shown in FIG. 1. As shown in FIG. 7, system 700 may include mobile device 722 and user terminal 724. While shown as a smartphone and personal computer, respectively, in FIG. 7, it should be noted that mobile device 722 and user terminal 724 may be any computing device, including, but not limited to, a laptop computer, a tablet computer, a hand-held computer, other computer equipment (e.g., a server), including "smart," wireless, wearable, and/or mobile devices.

FIG. 7 also includes cloud components 710. Cloud components 710 may alternatively be any computing device as described above and may include any type of mobile terminal, fixed terminal, or other device. For example, cloud components 710 may be implemented as a cloud computing system and may feature one or more component devices. It should also be noted that system 700 is not limited to three devices. Users, may, for instance, utilize one or more devices to interact with one another, one or more servers, or other components of system 700. It should be noted, that, while one or more operations are described herein as being performed by particular components of system 700, those operations may, in some embodiments, be performed by other components of system 700. As an example, while one or more operations are described herein as being performed by components of mobile device 722, those operations, may, in some embodiments, be performed by components of cloud components 710. In some embodiments, the various computers and systems described herein may include one or more computing devices that are programmed to perform the described functions. Additionally, or alternatively, multiple users may interact with system 700 and/or one or more components of system 700. For example, in one embodiment, a first user and a second user may interact with system 700 using two different components.

With respect to the components of mobile device 722, user terminal 724, and cloud components 710, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 7, both mobile device 722 and user terminal 724 include a display upon which to display data (e.g., conversational response, queries, and/or notifications).

Additionally, as mobile device 722 and user terminal 724 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.).

Additionally, the devices in system 700 may run an application (or another suitable program). The application may cause the processors and/or control circuitry to perform operations related to generating optimal data predictions.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 7 also includes communication paths 728, 730, and 732. Communication paths 728, 730, and 732 may include the Internet, a mobile phone network, a mobile voice or data network (e.g., a 5G or LTE network), a cable network, a public switched telephone network, or other types of communications networks or combinations of communications networks. Communication paths 728, 730, and 732 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 710 may be a database configured to store user data for a user. For example, the database may include user data that the system has collected about the user through prior interactions, both actively and passively. For example, the user data may describe one or more characteristics about a user, a user device, and/or one or more interactions of the user with a user device and/or application generating optimal data predictions. Alternatively, or additionally, the system may act as a clearing house for multiple sources of information about the user. This information may be compiled into a user profile. Cloud components 710 may also include control circuitry configured to perform the various operations needed to generate alternative content. For example, the cloud components 710 may include cloud-based storage circuitry configured to generate alternative content. Cloud components 710 may also include cloud-based control circuitry configured to runs processes to determine alternative content. Cloud components 710 may also include cloud-based input/output circuitry configured to generate optimal data predictions.

Cloud components 710 may include model 702, which may be a machine learning model (e.g., as described in FIG. 7). Model 702 may take inputs 704 and provide outputs 706. The inputs may include multiple datasets such as a training dataset and a test dataset. Each of the plurality of datasets (e.g., inputs 704) may include data subsets related to time series data. In some embodiments, outputs 706 may be fed back to model 702 as input to train model 702 (e.g., alone or in conjunction with user indications of the accuracy of outputs 706, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In some embodiments, model 702 may update its configurations (e.g., weights, biases, or other parameters) based on the assessment of its prediction (e.g., outputs 706) and reference feedback information (e.g., user indication of accuracy, reference labels, or other information). In some embodiments, where model 702 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 702 may be trained to generate better predictions.

In some embodiments, model 702 may include an artificial neural network. In such embodiments, model 702 may include an input layer and one or more hidden layers. Each neural unit of model 702 may be connected with many other neural units of model 702. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 702 may be self-learning and trained, rather than explicitly programmed, and can perform significantly better in certain areas of problem solving, as compared to traditional computer programs. During training, an output layer of model 702 may correspond to a classification of model 702 and an input known to correspond to that classification may be input into an input layer of model 702 during training. During testing, an input without a known classification may be input into the input layer, and a determined classification may be output.

In some embodiments, model 702 may include multiple layers (e.g., where a signal path traverses from front layers to back layers). In some embodiments, back propagation techniques may be utilized by model 702 where forward stimulation is used to reset weights on the "front" neural units. In some embodiments, stimulation and inhibition for model 702 may be more free-flowing, with connections interacting in a more chaotic and complex fashion. During testing, an output layer of model 702 may indicate whether or not a given input corresponds to a classification of model 702 (e.g., a user intent).

In some embodiments, model 702 may predict alternative content. For example, the system may determine that particular characteristics are more likely to be indicative of a prediction. In some embodiments, the model (e.g., model 702) may automatically perform actions based on outputs 706. In some embodiments, the model (e.g., model 702) may not perform any actions. The output of the model (e.g., model 702) is only used to predict a set of values for time series values and/or a confidence level for each of the predicted set of values for time series values.

System 700 also includes API layer 750. In some embodiments, API layer 750 may be implemented on mobile device 722 or user terminal 724. Alternatively or additionally, API layer 750 may reside on one or more of cloud components 710. API layer 750 (which may be A REST or Web services API layer) may provide a decoupled interface to data and/or functionality of one or more applications. API layer 750 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 750 may use various architectural arrangements. For example, system 700 may be partially based on API layer 750, such that there is strong adoption of SOAP and RESTful Web-services, using resources like Service Repository and Developer Portal but with low governance, standardization, and separation of concerns. Alternatively, system 700 may be fully based on API layer 750, such that separation of concerns between layers like API layer 750, services, and applications are in place.

In some embodiments, the system architecture may use a microservice approach. Such systems may use two types of layers: Front-End Layer and Back-End Layer where microservices reside, in this kind of architecture, the role of the API layer 750 may provide integration between Front-End and Back-End. In such cases, API layer 750 may use RESTful APIs (exposition to front-end or even communication between microservices). API layer 750 may use AMQP (e.g., Kafka, RabbitMQ, etc.). API layer 750 may use incipient usage of new communications protocols such as gRPC, Thrift, etc.

In some embodiments, the system architecture may use an open API approach. In such cases, API layer 750 may use commercial or open source API Platforms and their modules. API layer 750 may use developer portal. API layer 750 may use strong security constraints applying WAF and DDoS protection, and API layer 750 may use RESTful APIs as standard for external integration.

Figure 8:
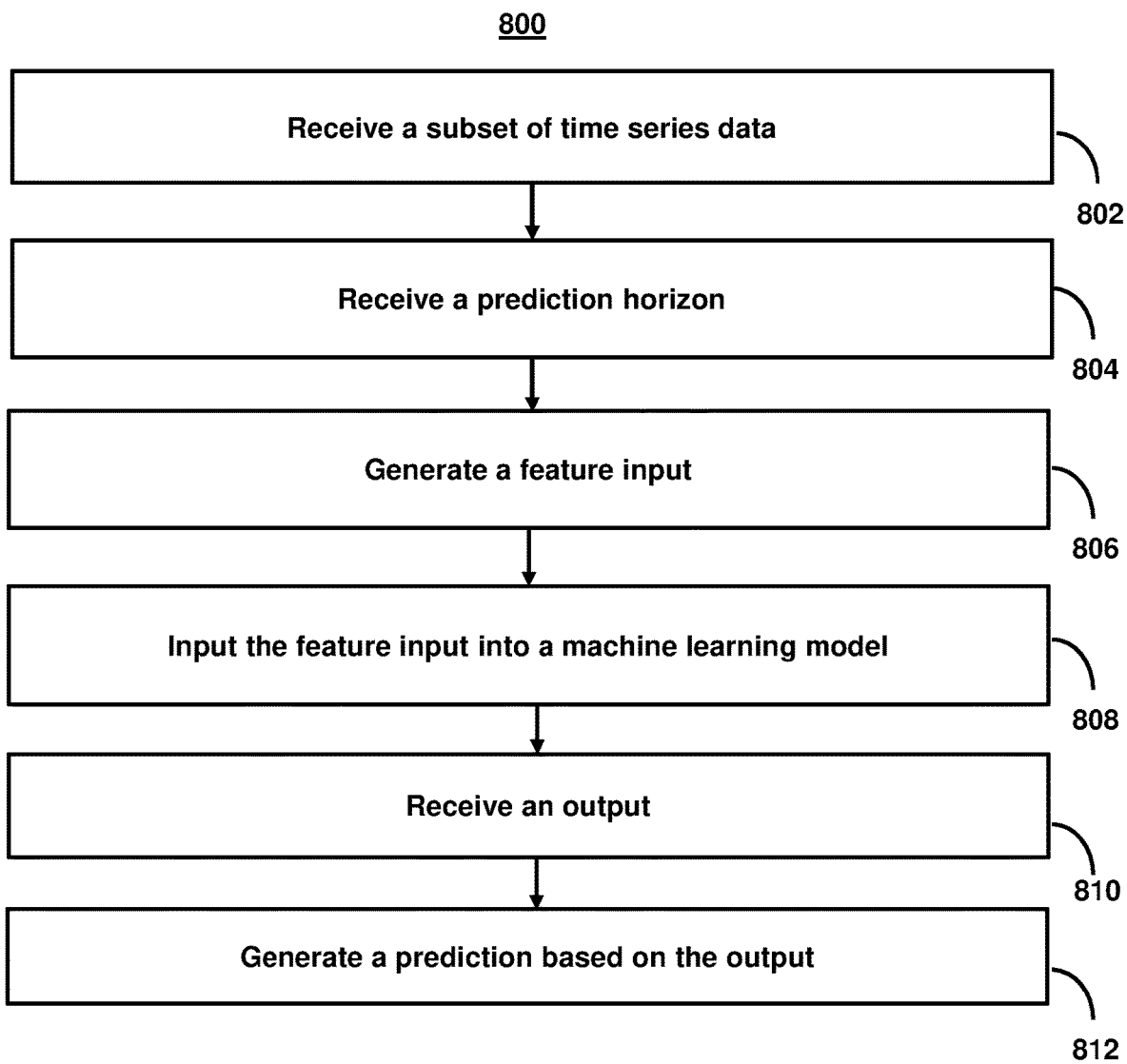
FIG. 8 shows a flowchart of the steps involved in generating optimal data predictions in time series data signals based on empirically-optimized model selection, noise filtering, and window size selection using machine learning models, in accordance with one or more embodiments.

FIG. 8 shows a flowchart of the steps involved in generating optimal data predictions in time series data signals based on empirically-optimized model selection, noise filtering, and window size selection using machine learning models, in accordance with one or more embodiments. For example, the system may use process 800 (e.g., as implemented on one or more system components) in order to generate optimal data predictions.

At step 802, process 800 (e.g., using one or more components described in system 700 (FIG. 7)) receives a subset of time series data. For example, the system may receive a first subset of time series data of a plurality of subsets of time series data. For example, the system may receive time series data from a given domain. The system may then generate one or more subsets based on a segregation by time and/or by other characteristics.

At step 804, process 800 (e.g., using one or more components described in system 700 (FIG. 7)) receives a prediction horizon. For example, the system may receive a prediction horizon indicating when (e.g., what day, hour, etc.) to receive a prediction for or how large a prediction window should be used. For example, a user may request (e.g., via user interface 100 (FIG. 1)) a specific prediction horizon to be selected. In response, the system may input the prediction horizon into the model and/or generate a feature input for the model based on the prediction horizon.

At step 806, process 800 (e.g., using one or more components described in system 700 (FIG. 7)) generates a feature input. For example, the system may generate a feature input based on the first subset of time series data and the prediction horizon. The feature input may comprise one or more values (e.g., organized in an array of values). The one or more values may indicate time and amounts at those times for the time series data.

At step 808, process 800 (e.g., using one or more components described in system 700 (FIG. 7)) inputs the feature input into a machine learning model. For example, the system may input the feature input into a machine learning model that has one or more components. In some embodiments, the model may include a first model component, wherein the first model component is trained to select, for given time series data and given prediction horizons, an optimal base model collection for the ensemble of base models and select an optimal parameter set for the optimal base model collection. Additionally or alternatively, the system may include a second model component, wherein the second model component is trained to select a filtering parameter for the given time series data and given prediction horizons. Additionally or alternatively, the system may include a third model component, wherein the third model component is trained to select an optimal window size for the given time series data and given prediction horizons.

In some embodiments, the ensemble of base models may comprise individual models and models based on combinations of the individual models. For example, the ensemble of base models may comprise all permutations of individual models and models based on combinations of all the permutations of the individual models.

In some embodiments, the variables for the various model components may include one or more variables in common. For example, the first model component may include values of the first subset of time series data, the prediction horizon, or the optimal window size. Additionally or alternatively, the second model component include values of the first subset of time series data, the prediction horizon, or the optimal window size. Additionally or alternatively, the third model component include values of the first subset of time series data, the prediction horizon, or the optimal parameter set.

In some embodiments, the second model component may comprise an empirically-optimized Gaussian smoothing filter, wherein empirically-optimized Gaussian smoothing filter comprises optimizing the filtering parameter and the optimal parameter set using a single function. Additionally or alternatively, the second model component may be trained to filter both stationary noise and non-stationary noise from the given time series data.

In some embodiments, the system may train the machine learning model using four-fold cross-validation.

At step 810, process 800 (e.g., using one or more components described in system 700 (FIG. 7)) receives an output. For example, the system may receive an output from the machine learning model. In some embodiments, the output may receive additional post processing and/or may otherwise be modified to generate a prediction. For example, in some embodiments, the output may include a value (or series of values) as well as an indication of a confidence level in the value. The system may then use the output to generate a prediction.

At step 812, process 800 (e.g., using one or more components described in system 700 (FIG. 7)) generates a prediction based on the output. For example, the system may generate for display, on a user interface, a prediction for the first subset of time series data at the prediction horizon based on the output. For example, the prediction may include a predicted set of values for time series values and a confidence level for each of the predicted set of values for time series values. In some embodiments, the prediction may include, encompass, and/or be related to other content that may be presented in user interface 100.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-7 could be used to perform one or more of the steps in FIG. 8.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a first subset of time series data; receiving a prediction horizon; generating a feature input based on the first subset of time series data and the prediction horizon; inputting the feature input into a machine learning model, wherein the machine learning model includes: a first model component, wherein the first model component is trained to select, for given time series data and given prediction horizons, an optimal base model collection for the ensemble of base models and select an optimal parameter set for the optimal base model collection; a second model component, wherein the second model component is trained to select a filtering parameter for the given time series data and given prediction horizons; and a third model component, wherein the third model component is trained to select an optimal window size for the given time series data and given prediction horizons; receiving an output from the machine learning model; and generating for display, on a user interface, a prediction for the first subset of time series data at the prediction horizon based on the output.
2. The method of any of the preceding embodiments, wherein the ensemble of base models comprises individual models and models based on combinations of the individual models.
3. The method of any of the preceding embodiments, wherein the ensemble of base models comprises all permutations of individual models and models based on combinations of all the permutations of the individual models.
4. The method of any of the preceding embodiments, wherein the second model component comprises an empirically-optimized Gaussian smoothing filter, wherein empirically-optimized Gaussian smoothing filter comprises optimizing the filtering parameter and the optimal parameter set using a single function.
5. The method of any of the preceding embodiments, further comprising training the machine learning model using four-fold cross-validation.
6. The method of any of the preceding embodiments, wherein variables for the first model component include values of the first subset of time series data, the prediction horizon, or the optimal window size.
7. The method of any of the preceding embodiments, wherein variables for the second model component include values of the first subset of time series data, the prediction horizon, or the optimal window size.
8. The method of any of the preceding embodiments, wherein variables for the third model component include values of the first subset of time series data, the prediction horizon, or the optimal parameter set.
9. The method of any of the preceding embodiments, wherein the second model component is trained to filter both stationary and non-stationary noise from the given time series data.
10. The method of any of the preceding embodiments, wherein the prediction includes a predicted set of values for time series values and a confidence level for each of the predicted set of values for time series values.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:

1. A system for generating optimal data predictions in real-time for time series data signals related to load processing in disparate computer networks based on empirically-optimized model selection, noise filtering, and window size selection using machine learning models, the system comprising:
cloud-based storage circuitry configured to store:
an ensemble of base models; and
a machine learning model, wherein the machine learning model includes:
a first model component, wherein the first model component is trained to select, for given time series data and given prediction horizons, an optimal base model collection for the ensemble of base models and select an optimal parameter set for the optimal base model collection, and wherein the optimal base model collection and optimal parameter set are selected by evaluating multiple candidate model structures and associated parameters to minimize prediction error and maximize a predictive performance metric;

a second model component, wherein the second model component is trained to select a filtering parameter for the given time series data and given prediction horizons; and a third model component, wherein the third model component is trained to select an optimal window size for the given time series data and given prediction horizons;

cloud-based control circuitry configured to:

receive a first subset of time series data, wherein the first subset of times series data comprises values for load amounts for processing requests on computer nodes;

receive a prediction horizon, wherein the prediction horizon comprises a future date for predicting a load amount for processing requests;

generate a feature input based on the first subset of time series data and the prediction horizon, wherein the feature input comprises a vectorized representation of the first subset of time series data and the prediction horizon;

input the feature input into the machine learning model; and receive an output from the machine learning model; and cloud-based input/output circuitry configured to generate for display, on a user interface, a prediction for the first subset of time series data at the prediction horizon based on the output, wherein the prediction comprises a graphical representation of a predicted set of values for time series values and a confidence level for each of the predicted set of values for time series values.

2. A method for generating optimal data predictions in real-time for time series data signals based on empirically-optimized model selection, noise filtering, and window size selection using machine learning models, the method comprising:

receiving a first subset of time series data, wherein the first subset of times series data comprises values for load amounts for processing requests on computer nodes;

receiving a prediction horizon, wherein the prediction horizon comprises a future date for predicting a load amount for processing requests;

generating a feature input based on the first subset of time series data and the prediction horizon, wherein the feature input comprises a vectorized representation of the first subset of time series data and the prediction horizon;

inputting the feature input into a machine learning model, wherein the machine learning model includes:

a first model component, wherein the first model component is trained to select, for given time series data and given prediction horizons, an optimal base model collection for an ensemble of base models and select an optimal parameter set for the optimal base model collection, and wherein the optimal base model collection and optimal parameter set are selected by evaluating multiple candidate model structures and associated parameters to minimize prediction error and maximize a predictive performance metric;

a second model component, wherein the second model component is trained to select a filtering parameter for the given time series data and given prediction horizons; and a third model component, wherein the third model component is trained to select an optimal window size for the given time series data and given prediction horizons;

receiving an output from the machine learning model; and generating for display, on a user interface, a prediction for the first subset of time series data at the prediction horizon based on the output, wherein the prediction comprises a graphical representation of a predicted set of values for time series values and a confidence level for each of the predicted set of values for time series values.

3. The method of claim 2, wherein the ensemble of base models comprises individual models and models based on combinations of the individual models.

4. The method of claim 2, wherein the ensemble of base models comprises all permutations of individual models and models based on combinations of all the permutations of the individual models.

5. The method of claim 2, wherein the second model component comprises an empirically-optimized Gaussian smoothing filter, wherein empirically-optimized the Gaussian smoothing filter comprises optimizing the filter parameter and the optimal parameter set using a single function.

6. The method of claim 2, further comprising training the machine learning model using four-fold cross-validation.

7. The method of claim 2, wherein variables for the first model component include values of the first subset of time series data, the prediction horizon, or the optimal window size.

8. The method of claim 2, wherein variables for the second model component include values of the first subset of time series data, the prediction horizon, or the optimal window size.

9. The method of claim 2, wherein variables for the third model component include values of the first subset of time series data, the prediction horizon, or the optimal parameter set.

10. The method of claim 2, wherein the second model component is trained to filter both stationary and non-stationary noise from the given time series data.

11. The method of claim 2, wherein the prediction includes a predicted set of values for time series values and a confidence level for each of the predicted set of values for time series values.

12. A non-transitory, computer readable medium for generating optimal data predictions in real-time for time series data signals based on empirically-optimized model selection, noise filtering, and window size selection using machine learning models comprising instructions that when executed by one or more processors, cause operations comprising:

receiving a first subset of time series data, wherein the first subset of times series data comprises values for load amounts for processing requests on computer nodes;

receiving a prediction horizon, wherein the prediction horizon comprises a future date for predicting a load amount for processing requests;

generating a feature input based on the first subset of time series data and the prediction horizon, wherein the feature input comprises a vectorized representation of the first subset of time series data and the prediction horizon;

inputting the feature input into a machine learning model, wherein the machine learning model includes:

a first model component, wherein the first model component is trained to select, for given time series data and given prediction horizons, an optimal base model collection for an ensemble of base models and select an optimal parameter set for the optimal base model collection, and wherein the optimal base model collection and optimal parameter set are selected by evaluating multiple candidate model structures and associated parameters to minimize prediction error and maximize a predictive performance metric;

a second model component, wherein the second model component is trained to select a filtering parameter for the given time series data and given prediction horizons; and a third model component, wherein the third model component is trained to select an optimal window size for the given time series data and given prediction horizons;

receiving an output from the machine learning model; and generating for display, on a user interface, a prediction for the first subset of time series data at the prediction horizon based on the output, wherein the prediction comprises a graphical representation of a predicted set of values for time series values and a confidence level for each of the predicted set of values for time series values.

13. The non-transitory, computer readable medium of claim 12, wherein the ensemble of base models comprises individual models and models based on combinations of the individual models.

14. The non-transitory, computer readable medium of claim 12, wherein the ensemble of base models comprises all permutations of individual models and models based on combinations of all the permutations of the individual models.

15. The non-transitory, computer readable medium of claim 12, wherein the second model component comprises an empirically-optimized Gaussian smoothing filter, wherein empirically-optimized the Gaussian smoothing filter comprises optimizing the filtering parameter and the optimal parameter set using a single function.

16. The non-transitory, computer readable medium of claim 12, further comprising training the machine learning model using four-fold cross-validation.

17. The non-transitory, computer readable medium of claim 12, wherein variables for the first model component include values of the first subset of time series data, the prediction horizon, or the optimal window size.

18. The non-transitory, computer readable medium of claim 12, wherein variables for the second model component include values of the first subset of time series data, the prediction horizon, or the optimal window size.

19. The non-transitory, computer readable medium of claim 12, wherein variables for the third model component include values of the first subset of time series data, the prediction horizon, or the optimal parameter set.

20. The non-transitory, computer readable medium of claim 12, wherein the second model component is trained to filter both stationary and non-stationary noise from the given time series data.

* * * * *